United States Patent [19]
Keever et al.

[11] 3,846,677
[45] Nov. 5, 1974

[54] PLASTIC WATTHOUR METER COVER HAVING AN INDEXED AND PROTECTED FRONT FACE

[75] Inventors: Joseph M. Keever; Gerald W. Finnen; James E. Ramsey, Jr., all of Raleigh, N.C.

[73] Assignee: Westinghouse Electric Corporation, Pittsburgh, Pa.

[22] Filed: July 9, 1973

[21] Appl. No.: 377,847

Related U.S. Application Data

[63] Continuation of Ser. No. 260,638, June 7, 1972, abandoned.

[52] U.S. Cl. ............................................. 317/107
[51] Int. Cl. ........................................... H02b 9/00
[58] Field of Search ......... 220/39 R, 40 R; 324/110, 324/156; 174/66, 67, 138 F; 317/104–111, 120

[56] References Cited
UNITED STATES PATENTS

| | | | |
|---|---|---|---|
| 2,907,491 | 10/1959 | Gunn | 220/40 R |
| 3,219,220 | 11/1965 | Hakim | 220/40 R |
| 3,527,372 | 9/1970 | Manning | 220/40 R |
| 3,628,096 | 10/1971 | Drew, Jr. | 317/111 |
| 3,659,457 | 5/1972 | Ostrowski | 324/156 |
| 3,683,102 | 8/1972 | Moran | 317/105 |

*Primary Examiner*—Robert K. Schaefer
*Assistant Examiner*—Gerald P. Tolin
*Attorney, Agent, or Firm*—R. W. Smith; Donald R. Lackey

[57] ABSTRACT

An improved watthour meter cover is made of a molded plastic material and has a series of index lugs at the front thereof for registering and attaching the cover to a base assembly by a locking means carried on the rear of the cover.

3 Claims, 8 Drawing Figures

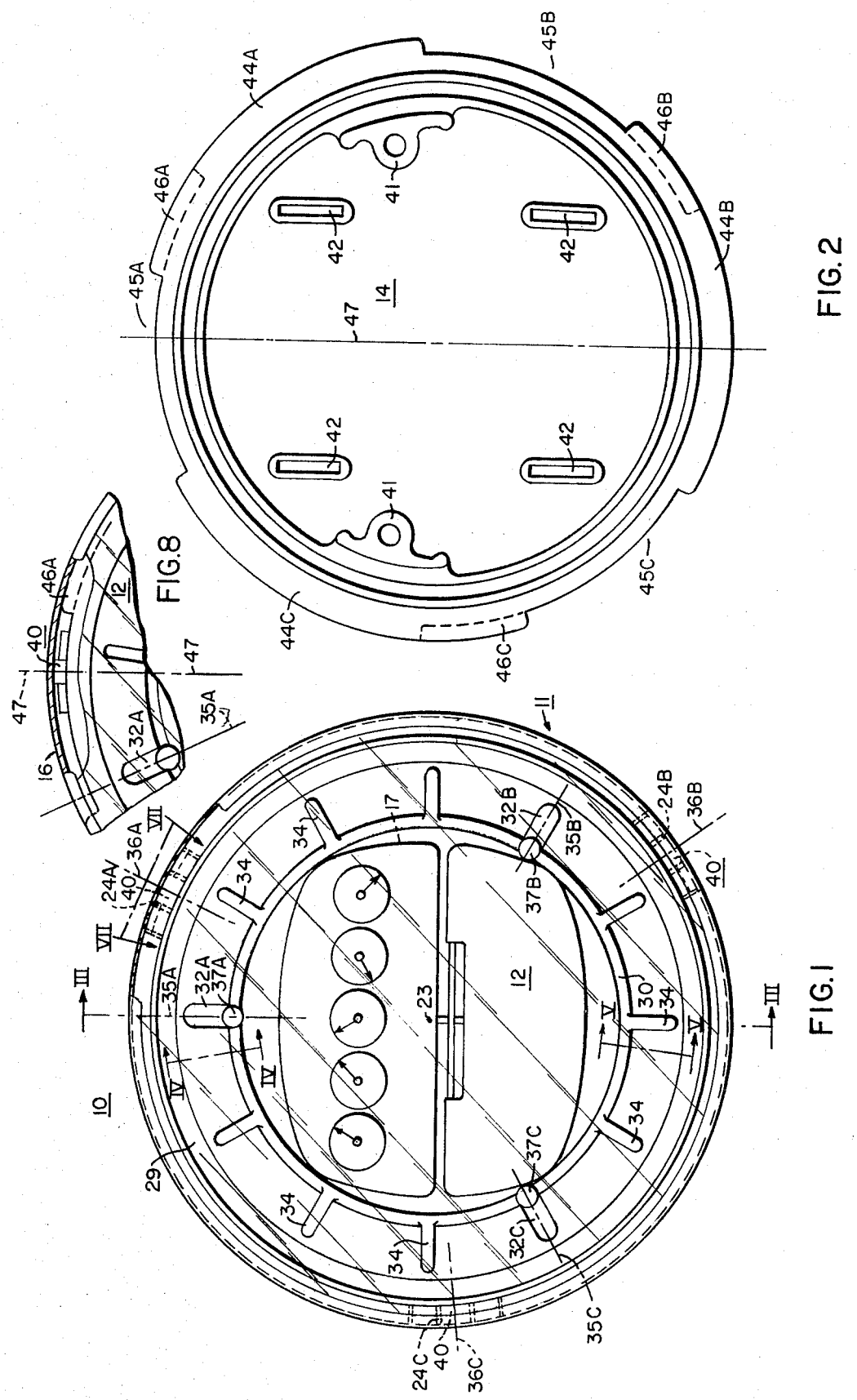

3,846,677

PLASTIC WATTHOUR METER COVER HAVING AN INDEXED AND PROTECTED FRONT FACE

CROSS REFERENCE TO RELATED APPLICATIONS

This application is a continuation application of application Ser. No. 260,638 filed June 7, 1972.

BACKGROUND OF THE INVENTION

This invention relates to enclosures for watthour meters and more particularly to a watthour meter cover made of a molded plastic material.

When watthour meters are used as a self-contained unit, the watthour meter movement is housed in a separable enclosure including a base assembly and a detachable cover. The cover is almost universally made of transparent glass and has a cup shape. The open end of the cover carries a metal rim for detachably mating the cover to the base assembly. Glass covers for watthour meters have proved to be the most practical and economical for universal use. However, the use of glass covers has been found undesirable where they are used under conditions so as to subject them to rough handling prior to installation or when mounted at installations subject to accidental impacts or intentional vandalism. The high impact strength of some molded plastic compositions enhances their application to watthour meter covers, however, plastic materials are usually softer and are more susceptible to being scratched or marred in use and many are not adequately resistant to wide ranges of temperature variations or the destructive effects of sun radiations.

SUMMARY OF THE INVENTION

In accordance with the present invention, a watthour meter enclosure includes an improved cup-shaped cover made of a molded plastic composition. The open end of the cover includes a circular mounting flange with predetermined locations for locking tabs that engage arcuate lugs of the enclosure base assembly. The front face of the cover, through which the meter register must be viewed for reading, is recessed and is circumscribed by a circular rib. Possible scratching or obliteration of the front face is reduced by the circular rib. A series of circumferentially spaced index and knurled lugs extend rearwardly from the circular rib and along the side of the cover to facilitate grasping the cover for attachment and removal relative to the base assembly. The index lugs are oriented relative to the locking tab locations on the mounting flange so as to be offset a predetermined arcuate distance therefrom thereby aiding initial registration of the locking tabs with with spaces between the arcuate lugs of the base assembly. When the rear side of the mounting flange engages the base assembly, subsequent rotation of the cover provides interlocking engagement of cover locking tabs with the arcuate lugs. An index lug will be positioned at the top of the cover when the final locked position is reached on the base assembly thereby indicating the locked position.

Accordingly, it is a general object of this invention to provide an improved plastic cover for a watthour meter enclosure which is made of a molded plastic composition, is rugged, the face thereof being protected from marring and scratches, and providing easier and more convenient handling for attachment and removal from a base assembly.

Other objects of this invention become apparent from a description of the drawing which is made hereinbelow.

BRIEF DESCRIPTION OF THE DRAWINGS

FIG. 1 is a front elevational view of a watthour meter enclosure including an improved plastic cover made in accordance with this invention;

FIG. 2 is a front elevational view of a base assembly separated from the enclosure illustrated in FIG. 1;

FIG. 8 is a fragmentary view of FIG. 1 when the plastic cover is in an initially attaching operative position with respect to the base assembly.

DESCRIPTION OF THE PREFERRED EMBODIMENT

Figure 3:
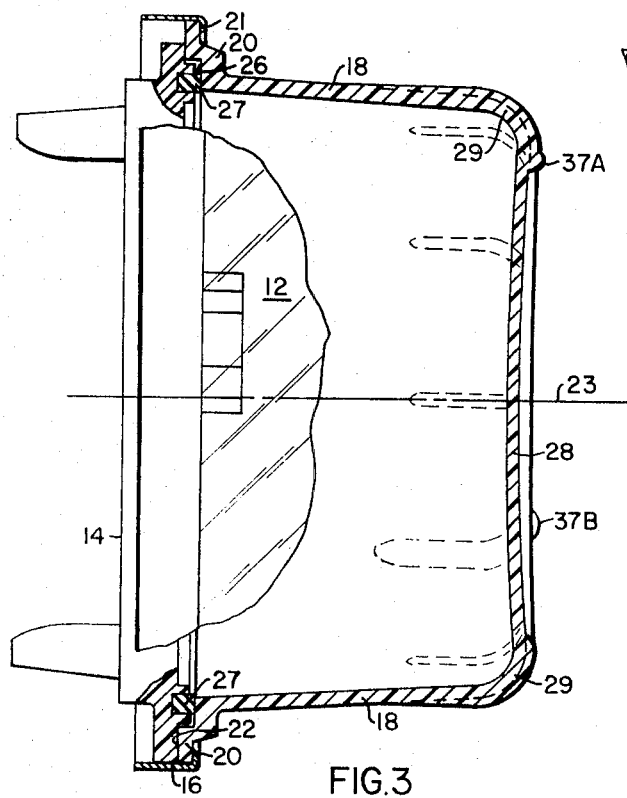
FIG. 3 is a side sectional view partially in elevation of the enclosure illustrated in FIG. 1 taken along the axis III—III and looking in the direction of the arrows.

Referring now to the drawings and more particularly to FIGS. 1 and 3, there is illustrated a selfcontained watthour meter unit 10 having an enclosure 11 including a plastic cover 12 made in accordance with this invention. The rear of the enclosure 11 is completed by a base assembly 14 which is illustrated in a front elevational view in FIG. 2 separated from the unit 10. The plastic cover 12 is shown in a detachably locked position on the base assembly 14, normally mounted at a fixed location, and is held thereon by means of a metal locking rim 16 in the manner described in detail hereinbelow. A watthour meter movement 17 is shown in FIG. 1 as it is viewed through the front of the plastic cover 12. The movement 17 is removed from the side cross-sectional view of FIG. 3 for purposes of simplifying the drawings.

The plastic cover 12 is made of a suitable molded plastic composition preferably a polycarbonate plastic composition including ultraviolet inhibitor constituents. This plastic is transparent and also resists the destructive effects of ultraviolet radiations which cause clouding of plastics when subjected to sunlighted conditions. The configuration of the plastic cover 12 is generally cup shaped having a side surface 18, with a circular cross section, a cross-sectional view of which is shown in FIG. 3. A circular mounting flange 20 extends radially outward from the rear open end of the cover 12. The exposed front and rear radial sides 21 and 22 of the mounting flange 20 are flat and extend perpendicular to the center longitudinal axis 23 of the cover 12. The rear radial side 22 of the mounting flange 20 includes three locations for positioning a locking tab arrangement, described hereinbelow in which the locations are defined by radially extending closed-end grooves 24A, 24B and 24C, shown in FIG. 1. These grooves have fixed predetermined positions 120° apart to be indexed relative to the front configuration of the plastic cover 12 and to the base assembly 14 as described hereinbelow. The rear flange side 22 is stepped forward to form an annular offset portion 26. A suitable sealing arrangement such as an elastomeric ring 27 provides a tight seal between the offset portion 26 and an annular forward projecting lip of the base assembly 14 as, for example, is described in U.S. Pat. Nos. 3,590,376 and 3,628,096 assigned to the assignee of this invention. The side 18 extends forward from the open rear end and is tapered slightly inward at an angle of approximately 3 ½° as it extends along a conical surface to a corner 29 and the front face 28 of the cover at the closed end thereof. The thickness of the side 18 and the front face 28 is in the order of 0.125 inch. The corner 29 between the side 18 and the front face 28 is arcuate having a radius in the order of 0.375 inch. The front face 28 extends radially inward from the arcuate corner 29 so as to have a concave dished surface configuration recessed inwardly of the corner 29. The front face 28 has an outer diameter of approximately 4.4 inches in the preferred embodiment illustrated for viewing the dial plate of the meter movement 17 as shown in FIG. 1.

Figure 4:
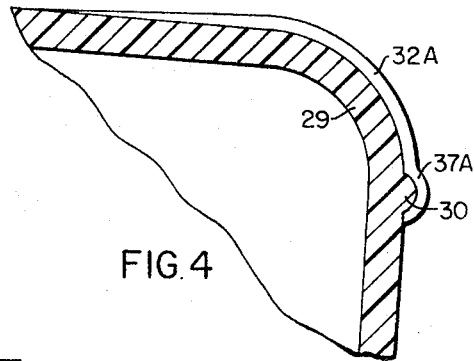
FIG. 4 is an enlarged fragmentary view of FIG. 1 taken along the axis IV—IV and looking in the direction of the arrows.

A circular rib 30 circumscribes the outer diameter of the front face 28 and has an arcuate cross-section, as shown in FIG. 4, with a width of approximately 0.125 inch and projects forward approximately 0.032 inch. The circular rib 30 increases the strength of the cover front and further protects the surface of the front face 28 from being scratched or marred.

A series of equally circumferentially spaced index lugs 32A, 32B and 32C and knurled lugs 34 extend around the corner 29 and rearward from the circular rib 30 so as to be directed symmetrically about the center longitudinal axis 23. In the preferred embodiment illustrated, the three grooves 24A, 24B and 24C, noted hereinabove, require a corresponding number of three index lugs 32A, 32B and 32C. In accordance with this invention, the index lugs 32A, 32B and 32C are positioned so that they are centered along three equidistant radial axes 35A, 35B and 35C disposed at an angle of approximately twenty-four degrees in a counter-clockwise direction from radial axes 36A, 36B and 36C extending through the centers of the grooves 24A, 24B and 24C, respectively. This provides an important feature of this invention wherein the index lugs facilitate the ease of aligning and attaching the plastic cover 12 to the base assembly 14. The particular angular relationship between each of the index lugs and each groove is such that when the plastic cover 12 is in the locked position on the base assembly 14, one of the index lugs such as 32A will be oriented at the top of the plastic cover 12 and coincide with the plane of the center vertical axis 47 of the enclosure 11 which is established by the fixed mounting of the base assembly 14 as shown in FIG. 2.

The knurled lugs 34 are equally spaced circumferentially between the 120° spaced index lugs 32A, 32B and 32C. In the embodiment shown in FIG. 1, there are nine substantially identical knurled lugs spaced at an angle of approximately 30° from an adjacent lug.

An enlarged side view of the index lug 32A as viewed in FIG. 4 illustrates a semispherical projection 37A terminates the forward end of the index lug 32A and is centered over the circular rib 30. The projection 37A extends forward of the front most portion of the cover at the corner 29 and has a thickness of approximately 0.063 inch. Identical semispherical projections 37B and 37C similarly terminate the forward ends of the index lugs 32B and 32C which are identical to the index lug 32A. The projections support the cover 12 when it is detached and placed face down such that the face 28 is protected from scratches. The remaining portion of the index lugs extend rearward around the outer surface of the corner 29 and above the outer surface of the side 18 at an angle of approximately 3 ½° until merging with the surface of the side 18. The width of each index lug is approximately 0.25 inch and each has an arcuate outer surface which extends longitudinally parallel to the axis 23.

Figure 5:
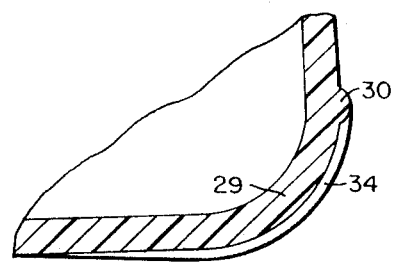
FIG. 5 is another enlarged fragmentary view of FIG. 1 taken along the axis V—V and looking in the direction of the arrows.

The knurled lugs 34 have arcuate outer surfaces which extend from inner front ends merging with the circular rib 30 as shown in the enlarged view of FIG. 5. The front thickness of each knurled lug is approximately 0.032 inch which is also the thickness of the circular rib 30. Each knurled lug has a width of approximately 0.125 inch and extends at an angle of approximately 3 ½ degrees to the side 18 so as to merge therewith at the rearward end thereof. These knurled lugs 34 also extend substantially parallel to the center longitudinal axis 23. Accordingly, the index and knurled lugs are spaced so that the fingers of the hand of a user will engage the sides of these lugs upon grasping the front of the plastic cover 12 and rotating the cover to attach or remove the cover from the base assembly 14. It is known that the outer surface of watthour meter covers are often slippery and difficult to remove. For example, the compressing of the elastomeric ring 27 which as a high coefficient of friction makes turning of the cover 12 extremely difficult in some instances.

Figure 6:
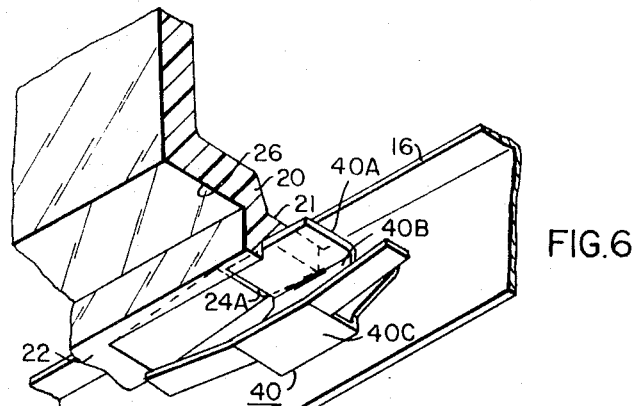
FIG. 6 is a fragmentary isometric view with portions cut away of rear area of the plastic cover when assembled with a locking rim and separated from the base assembly.
Figure 7:
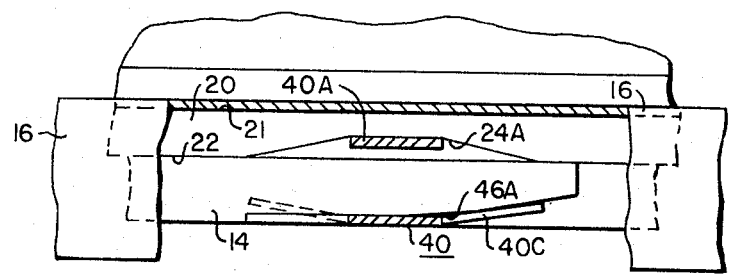
FIG. 7 is an enlarged fragmentary view of FIG. 1 taken along the axis VII—VII and looking in the direction of the arrows.

The metal locking rim 16 has a configuration which is already known to those skilled in the art. The forward end of the rim is bent radially inward to define a narrow flange edge which fits over the forward radial side 21 of the cover mounting flange 20, as shown in FIGS. 3 and 6. The cylindrical body of the metal rim 16 covers the outer peripheral edge of the mounting flange 20 and extends longitudinally rearward so as to overlap and extend beyond the outer peripheral edge of the base assembly 14, as shown in FIG. 3. A series of three locking tabs 40, an isometric view of one being shown in the cut-away portion of FIG. 6, are spot welded to the inner wall of the body of the metal rim 16 to provide fixed attachment of the rim 16 to the cover mounting flange 20. The locking tabs 40 have a generally U-shaped side cross-sectional configuration as shown in FIG. 6 with one leg 40A thereof adapted to fit within one of the cover grooves 24A, 24B and 24C. The bottom 40B of the tab 40 is positioned against the rim 16 for welding and the other leg 40C has a pair of wing projections shown in FIGS. 1 and 7. The leg 40A overlaps in spaced relationship the narrow flange edge of the metal rim 16 a distance equal to the thickness of the flange 20 at the locking tab grooves so as to clamp the radial sides 21 and 22 of the mounting flange 20 therebetween. The rim 16 is prevented from rotating relative to the mounting flange 20 by sides the legs 40A of the locking tab 40 abutting sides of the grooves such as groove 24A as shown in FIG. 7. The opposite leg 40C of each locking tab carries the pair of resilient, circumferentially directed wing projections spaced beyond the rear side 22 of the mounting flange 20. These wing projections engage the rear of the base assembly 14 to clamp the mounting flange 20 to the base assembly 14 as described hereinbelow in connection with the description of FIG. 7.

As shown in FIG. 2, the base assembly 14 has a conventional design with meter movement support bosses 41, slots 42 for receiving the blade terminals of the movement 17 and arcuate lugs 44A, 44B and 44C extending radially to define the outer peripheral edge of the base assembly 14. Arcuate spaces 45A, 45B and 45C are substantially equal and separate the substantially identical arcuate lugs 44A, 44B and 44C by approximately 41°. These arcuate spaces 45A, 45B and 45C permit the wing projections of the legs 40C of the locking tabs 40 to extend behind rear camming surfaces 46A, 46B and 46C which extent circumferentially approximately 21° in a clockwise direction, as viewed in FIG. 2 from the most counter-clockwise end of the arcuate lugs 44A, 44B and 44C, respectively. These camming surfaces are formed by a notch extending radially into the outer peripheral edge of the arcuate lugs and into the plane of the drawings as viewed in FIG. 7 and are tapered rearward to define the configuration of the camming surfaces. The open end of the camming surfaces 46A, 46B and 46C are located at the most counter-clockwise edge of the arcuate lugs and are arcuately displaced approximately 10 ½° from the planes of the radial axes 35A, 35B and 35C of the index lugs when the plastic cover is in the locked position, as shown in FIG. 1. The counterclockwise end of the arcuate lug 44A is positioned clockwise of the longitudinal vertical axis 47 of the assembly 14 approximately 11°. The camming surfaces extend circumferentially approximately twenty-one degrees to have an arcuate extent slightly greater than the distance between the tips of the wing projections of the locking tabs 40. The tips of the wing projections are spaced less the thickness of the camming surfaces from the rear side 22 to provide the resilient clamping force. A tip end of the locking tabs 40 engages the end of the camming surfaces to finally seat the locking tabs 40 in position as shown in FIG. 7. When this occurs, the top index lug 32A will be aligned with the center vertical axis 47 of the base assembly 14 so that the radial axis thereof coincides with the axis 47 when viewed from the front as in FIG. 1. Since the plastic cover 12 is symmetrical, the index lugs 32B or 32C can replace the position of the index lug 32A in FIG. 1.

The index lugs 32A, 32B and 32C provide a convenient means for attaching the cover 12 to the base assembly 14, as shown in FIG. 8. To attach the cover 12, its open end is oriented toward the base assembly 14 with the metal rim 16 concentrically disposed relative to the outer periphery of the arcuate lugs 44A, 44B and 44C. One of the index lugs such as 32A is positioned at a location counter-clockwise relative to the longitudinal vertical axis 47 of the assembly 14 so that its radial axis 35A is oriented between about 20 to 40° therefrom, as determined by the circumferential length of the spaces 45A, 45B and 45C and the length between the tip ends of the wing projections, so that the locking tabs 40 will be received by the arcuate space 45A, 45B and 45C. When the plastic cover 12 is pressed rearward the wing projections of the locking tab legs 40C will extend behind the camming surface 46A, 46B and 46C. As the cover 12 is rotated clockwise, as viewed in FIG. 8, the wing projection will engage the camming surfaces such as 46A and as the axis 35A of the upper index lug 32A is rotated toward the base assembly vertical axis 47, the wing projections are bent rearward providing a resilient clamping force thereagainst. Upon the wing projections being seated against the closed end of the camming surfaces, as in FIGS. 1 and 7, the plastic cover 12 is attached in the locked mounting position relative to the base assembly 14. The upper index lug 32A will be centered along the vertical axis 47 and in the finally attached position shown in FIG. 1. This will, of course, symmetrically position the lower index lugs 32B and 32C on equally spaced opposite sides of the vertical axis 47 for a pleasing asthetic appearance.

While the embodiment of the plastic cover 12 has described hereinabove constitutes one preferred form it is noted that other embodiments are within the spirit and scope of our invention.

We claim:

1. A watthour meter enclosure comprising the combination of a molded plastic cup-shaped cover extending along a center longitudinal axis and a vertically mountable base assembly having a center vertical axis; said base assembly detachably carrying said cover on three equally circumferentially spaced arcuate lugs having a predetermined orientation relative to said vertical axis; said cover including a forward closed end, a side surface extending rearwardly with a circular cross section from said closed end to a rear open end, a radial mounting flange extending around the open end, said flange including three circumferentially spaced locking tabs positioned along three equidistant radial axes extending from said longitudinal axis at said open end in rotational engagement with said arcuate lugs, a transparent circular front face area having an outer circumference in said closed end for viewing the dial plate of a meter movement mountable on said base assembly; three forward end projections extending from said closed end forward of any other front most part of said closed end, said three forward end projections being radially positioned outside said front face area at the outer circumference of said front face area to terminate said closed end beyond said front face area, and said three forward end projections being positioned equally circumferentially spaced relationship along three equidistant radial axes extending from said longitudinal axis at said closed end with the last named axes being displaced about said longitudinal axis at equal predetermined arcuate distances from said radial axes at said open end such that each of the end projections is arcuately displaced at a predetermined arcuate distance relative to a separate one of the locking tab positions so that one of said end projections is positioned along a vertical axis longitudinally coinciding with the center vertical axis of said base assembly said cover is attached by said locking tabs in the final rotated mounting position on said arcuate lugs of said base assembly.

2. A molded plastic cup-shaped cover for an enclosure of a watthour meter in which a vertically mountable base assembly having a center vertical axis detachably carries said cover on three equally circumferentially spaced arcuate lugs, said cover comprising: a forward closed end; a side surface extending from said closed end to a rear open end; a radial mounting flange extending around said open end, said flange carrying circumferentially spaced locking tabs engageable with said arcuate lugs so as to removably attach said cover to said base assembly; a front face in said closed end for viewing the dial plate of a meter movement mountable on said base assembly; a circular rib projecting forward and circumscribing said front face; a symmetrical series of index lugs extending radially outwardly from said circular rib and formed by raised surfaces disposed around the corner between said closed end and said side surface such that each of the index lugs is arcuately spaced at a predetermined circumferential index location relative to a separate one of said locking tabs and anyone of said index lugs is positional in coalignment with the center vertical axis of said base assembly when said cover is attached in a final mounting position on said base assembly, each of said index lugs further including a raised projection extending forward of said circular rib; and a series of knurled lugs, each extending along outwardly raised surfaces rearwardly from said circular rib around the corner between said closed end and said side surface in substantially equally circumferentially spaced relationship with the other knurled lugs and said index lugs, to permit manual grasping therebetween around the forward portion of said side surface.

3. The molded plastic cup-shaped cover as claimed in claim 2 wherein said front face includes a concave surface recessed rearwardly from the circular rib.

* * * * *